No. 828,547. PATENTED AUG. 14, 1906.
G. W. HAYDEN.
VALVE OPERATING MECHANISM.
APPLICATION FILED APR. 9, 1904.

Witnesses:
Paul Carpenter
Edward C. Burns

Inventor:
George W. Hayden
By Paul Synnestvedt
Atty.

No. 828,547. PATENTED AUG. 14, 1906.
G. W. HAYDEN.
VALVE OPERATING MECHANISM.
APPLICATION FILED APR. 9, 1904.

Witnesses:
Paul Carpenter
Edward C. Burns

Inventor:
George W. Hayden
By Paul Synnestvedt
Att'y

UNITED STATES PATENT OFFICE.

GEORGE W. HAYDEN, OF CHICAGO, ILLINOIS, ASSIGNOR TO CRANE COMPANY, OF CHICAGO, ILLINOIS, A CORPORATION OF ILLINOIS.

VALVE-OPERATING MECHANISM.

No. 828,547.     Specification of Letters Patent.     Patented Aug. 14, 1906.

Application filed April 9, 1904. Serial No. 202,465.

*To all whom it may concern:*

Be it known that I, GEORGE W. HAYDEN, a citizen of the United States, residing at Chicago, in the State of Illinois, have invented certain new and useful Improvements in Valve-Operating Mechanism, of which the following is a specification.

My invention relates to electrically operated means for opening and closing valves, and is particularly designed and applied herein for use with a gate valve. The objects of the invention are; to provide electric means for opening large gate valves and means for automatically breaking the current when the valve in opening or closing has reached the limit of its movement; to provide a superior form of gearing and mounting for the valve; to provide a superior mounting of the valve upon its stem to insure its prompt starting and firm seating; to provide superior controlling mechanism for gate valves; to provide a certain improved electric switching mechanism, and to generally improve the structure and operation of electrically operated valves. These objects, and other advantages which will hereinafter appear, I attain by means of the construction illustrated in preferred form in the accompanying drawings, wherein—

Figure 1:
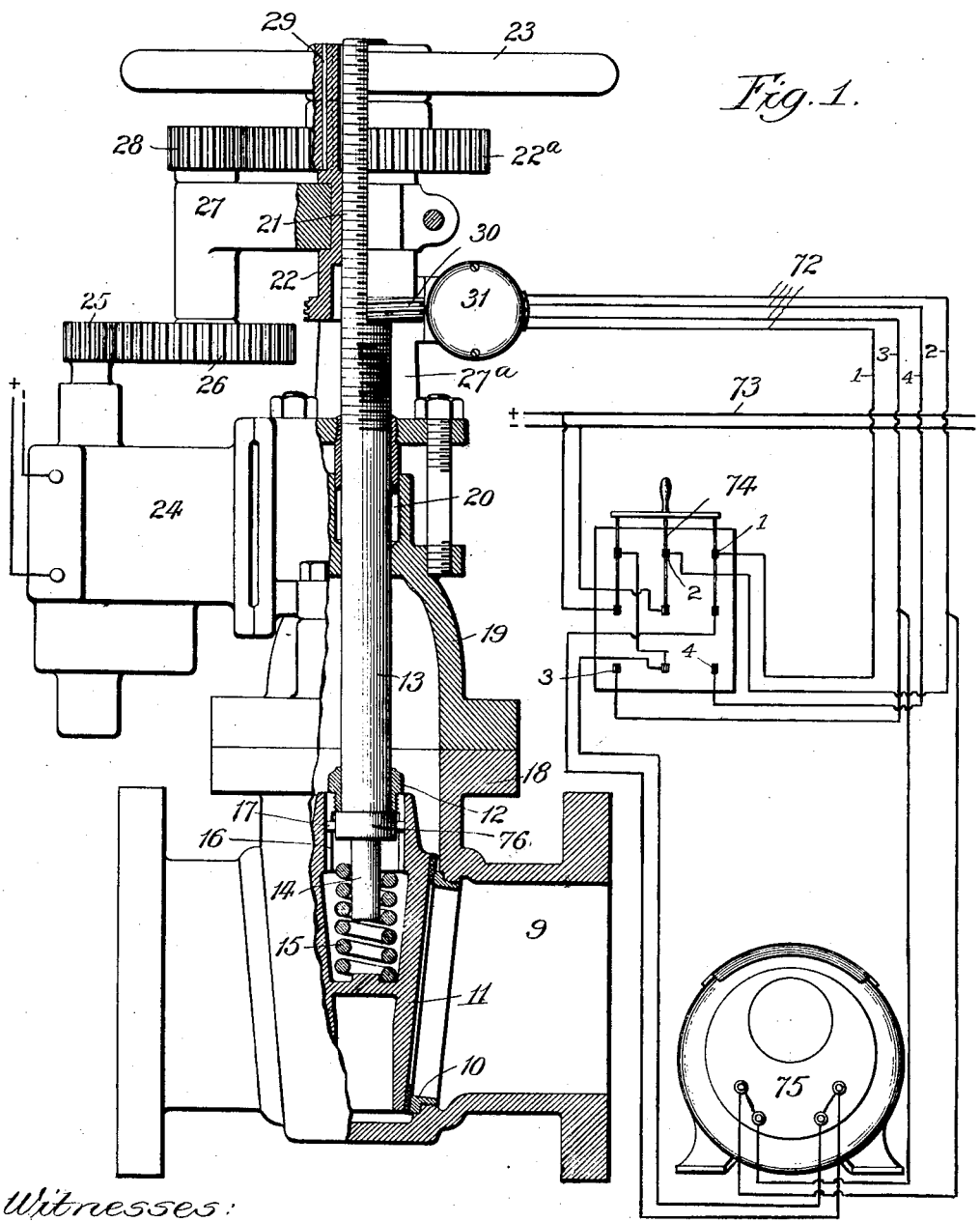
Figure 1 is a side elevation and partial vertical section of a gate valve with my apparatus for electrically operating it attached thereto.

Referring first to Figure 1, which shows the general features of the entire apparatus, it will be seen that I have provided a valve casing 9 in which are fixed slanting valve seats 10 engaging the sides of the gate valve 11. This valve is wedge-shaped and partly hollow and its top is closed by the screw plug 12 which guides the valve stem and retains the enlarged end thereof 76. The stem 13 has a reduced downward projection 14 which guides the spiral spring 15 provided in order to take up the thrust of the stem when the valve comes down to its seat and the movement of the stem has not yet ceased. In order that the stem may not rotate I have provided in the top of the valve opening a pair of guide grooves 16 which engage pins 17 on the head 76 of the valve stem. The valve casing at the top has an enlarged opening to accommodate the valve when withdrawn from its seat, extending through the head 18 and the supplemental casing bonnet 19 fastened thereon.

The top of the bonnet 19 is provided with an opening for the guidance of the valve stem extending through the stuffing box 20. The top of the valve stem is provided with threads 21 which are engaged by the rotary collar 22 and the top of the collar has fixed to it by key 29 the gear 22ª and also the hand wheel 23 for manually operating the valve by raising or lowering the screw when desired.

Fixed upon the top of the casing 19 and laterally exending therefrom is a motor and its casing, 24, which may be of any preferred form, and is designed by means of its driving pinion 25 to turn the shaft of gear wheels 26 and 28, the shaft being mounted in the bracket 27. The bracket 27 also serves as a support and guide for the revoluble collar 22 and is made rigid with the bonnet 19 of the valve casing by means of the upright bracket 27ª.

Figure 2:
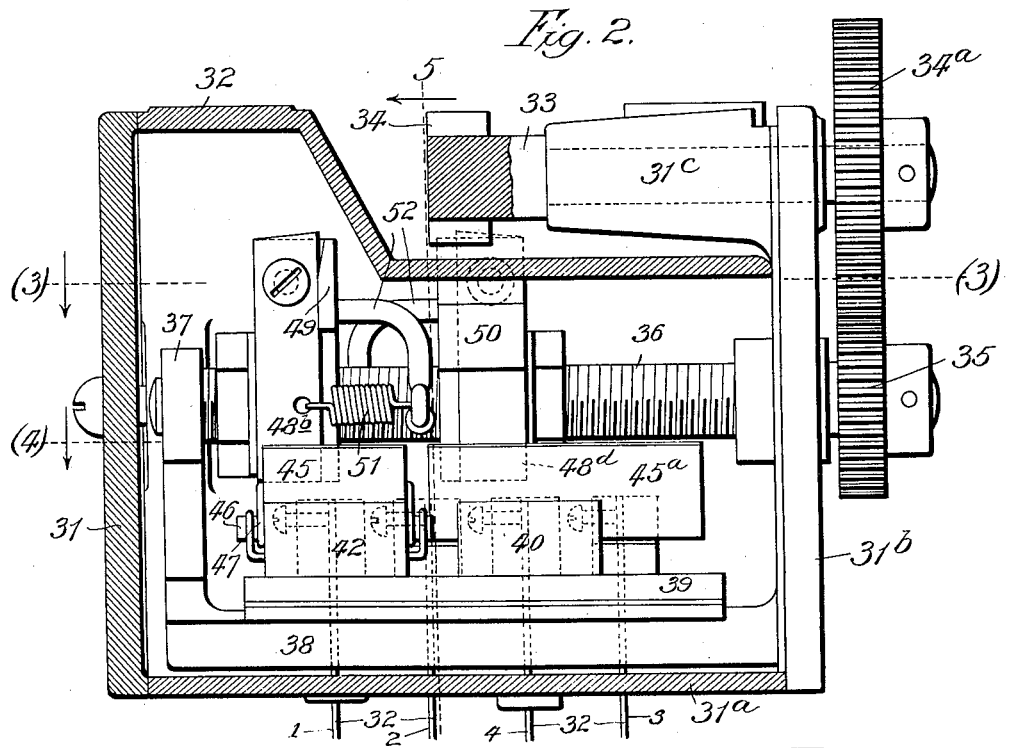
Figure 2 is a horizontal section taken on line (2) in Figure 3.
Figure 3:
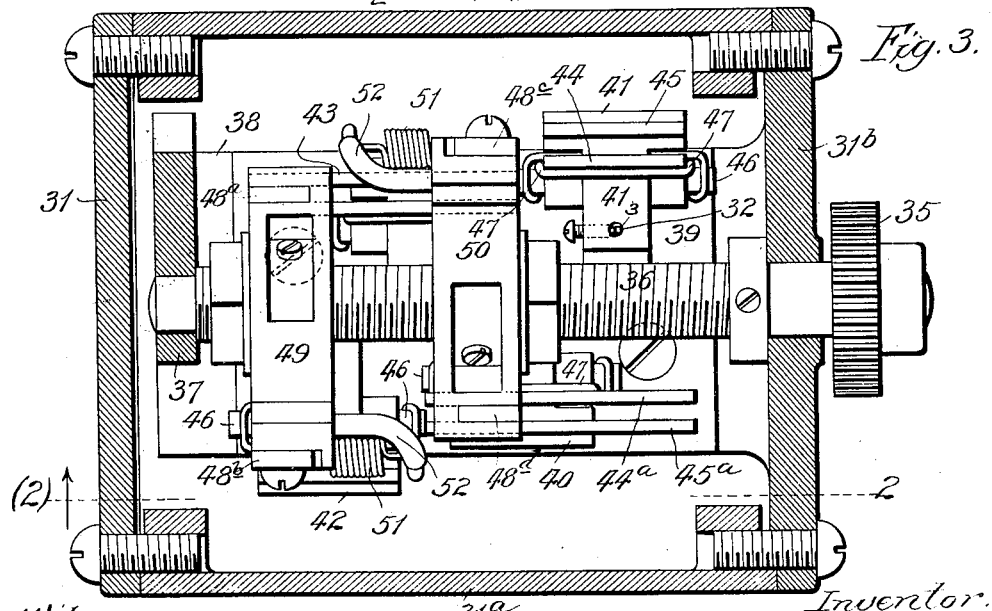
Figure 3 is a vertical section taken on line (3) of Figure 2, showing the interior mechanism of the electric control device marked 31 in Figure 1.

It will be understood from this construction that when the motor revolves and turns the gearing, the gear wheel 22ª will cause the revolution of the collar 22, and the revolution of the collar 22 will cause the valve stem 13 to raise or lower, depending upon the direction of the revolution, and open or close the valve 11 therein. For the purpose of stopping the motor when the valve has reached the limit of its movement either upward or downward, I have provided an electric switch mechanism in the casing 31, attached to the upright 27ª and operated by engagement of the worm 30 with the gear 34, in Figure 2. The switch mechanism is connected with wires 72 which are connected with the line or feed wires 73, through a suitable electric switch 74, provided for running the valve either direct or reverse, the current of course being provided by a generator at some suitable point as indicated at 75 in the lower part of Figure 1, and operating the motor 24.

Figure 4:
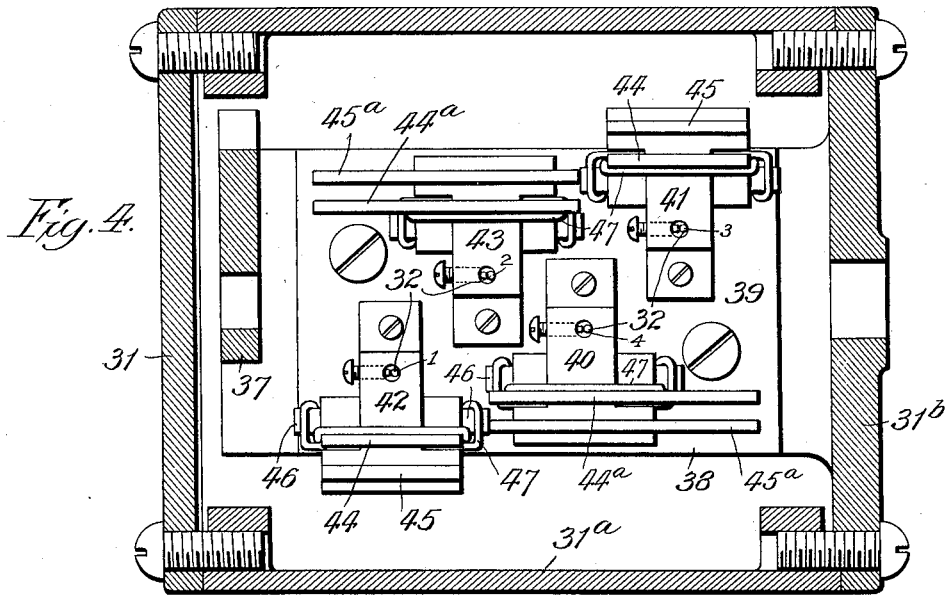
Figure 4 is another vertical section, taken on line (4) of Figure 2, showing in elevation the switch blocks and other parts.
Figure 5:
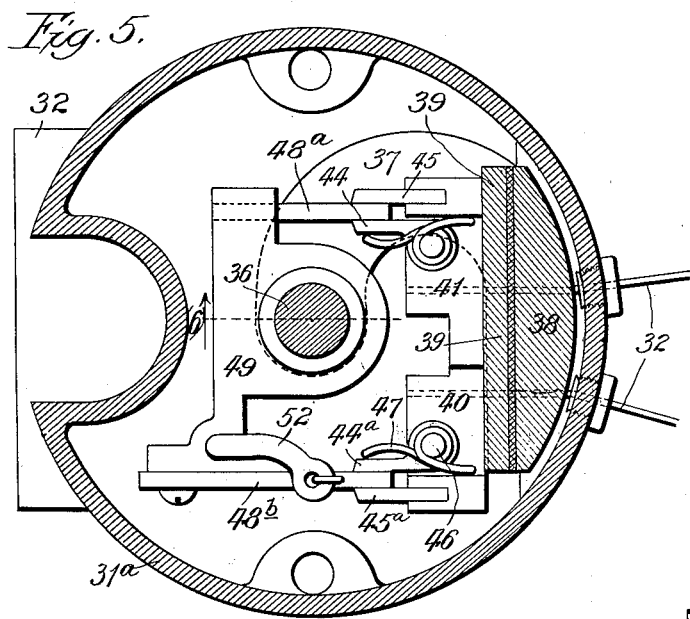
Figure 5 is a vertical section taken in the plane of the valve stem, on line (5) of Figure 2.

In Figures 2 to 7 I have represented the mechanism for shifting the current for the purpose of starting and stopping the valve at the two extremes of its motion. The casing of the switch mechanism is composed of a cylinder $31^a$ having the two heads 31 and $31^b$, and it is provided with a projecting portion 32 to form a seat and attach the casing to the uprights $27^a$ as shown in Figure 1, the casing $31^a$ being placed so as to engage gear 34 with worm 30. The shaft 33 in collar $31^c$ by means of gear $34^a$ turns gear 35 and its shaft 36 passes through the center of the casing and its rear end is journaled in the upright arm 37 of the base plate 38 therein. This shaft is threaded, and its rotation causes a lateral shifting of the switch devices shown in these figures. By reference particularly to Figures 4, 5, and 7, it will be seen that on the base 38 and block 39 I have provided four terminal blocks 40, 41, 42, and 43, which receive the electric wires 32 therein as shown in Figure 4, these being sub-referenced as 1, 2, 3, 4, to correspond with the wires in Figure 1. These blocks are all alike except for the length of their blades and are shown in perspective in Figure 7. The base block is grooved out and has one clamping jaw 45 which is stationary, and one, 44, which is journaled upon the shaft 46, and is held in place by means of the coil spring 47. Two of these blocks, 41 and 42, have short jaws, 44, 45, while the other blocks have longer jaws, $44^a$ and $45^a$, as shown in Figure 4. These jaws clamp upon the moving contact blades $48^c$ and $48^d$ and $48^a$ and $48^b$ which are attached in pairs to traveling heads 50 and 49 respectively, which are provided with internal screw threads and engage and travel along the revolving shaft 36. From Figure 2 it will be seen that the blades $48^b$ and $48^c$ are hinged at the top to the blocks 49 and 50 and connected with coil springs 51 carried by the arms 52 projecting laterally from the blocks. When blade $48^b$ moves to the right in Figure 3 it is at first in contact with blades 44 and 45 of block 42 and when the valve has reached the limit of its motion the blade is released from blades 44 and 45 and the spring 51 makes a sudden withdrawal to avoid sparking. The blade $48^a$ is meanwhile always in contact with the blades of block 43 and thus the current is broken between terminal 32' and $32^2$ (Figure 4), which interrupts flow through 1 and 2 of wires 72 (when the switch 74 is down) and stops the motor 24. The reverse motion when switch 74 is up, and the heads 49 and 50 are traveling to the left, is the same; the two heads and the two pairs of contact blocks are alike in structure and operation.

It is evident that any other device for stopping the motor at the right time could be used, but I prefer the above described switch mechanism because the positions of traveling heads 49 and 50 can be adjusted on the shaft 36 with extreme nicety to stop the motor 24 at the precise point when the valve is seated or opened to the right point.

The common difficulty of starting large valves from their seats I overcome by the peculiar mounting of the valve stem. It will be seen in Figure 1 that the stem 13 may travel down somewhat after the valve 11 is well seated by the pressure of spring 15. Now when the motor is started the head 76 strikes the plug 12 a sharp blow and insures the prompt starting of the valve off its seat, after which the movement is uniform.

Figure 6:
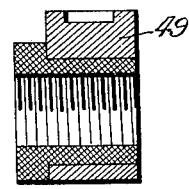
Figure 6 is a sectional view of the bearing nut of the head on the central shaft in the casing, taken on line (6) in Figure 5.
Figure 7:
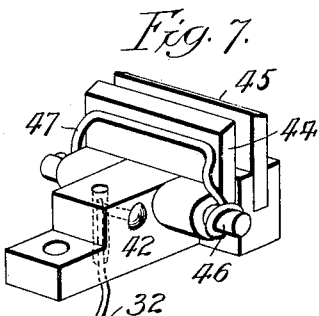
Figure 7 is a perspective view of one of the contact blocks for making connection with the moving blades on the shifting head in the apparatus.

The parts of the apparatus being as shown in Figure 1, with the valve upon its seat and the switch 74 in the position shown, to connect the terminals 1 and 2 of the wires 72, the operation will be as follows:

The bearing of the blocks 49 and 50 being insulated from the shaft 36 as will be apparent from the section of Figure 6, there is no connection between blocks 49 and 50, and as long as the switch 74 is down, the motor is not actuated. But upon throwing up the switch 74 as shown contact will be made between the terminals 1 and 2 of the wires 72, and the terminals $32^2$ and 32' as shown in Figure 4 will be connected by means of the block 49. The circuit is made and the block 49 will thereupon be actuated to move to the right by revolution of the shaft 36 driven directly by the motor; this contact will continue until the switch blade $48^b$ breaks its contact with the blades 44 and 45 of the block 42, meanwhile the blade $48^a$ remaining in contact with the long blades $44^a$ and $45^a$ of the block 43. When the current is thus broken of course the motor will stop. The block 50 in the meanwhile has been carried over to the extreme right. Now if the switch 74 be lowered to the opposite of the position shown in Figure 1, making contact with terminals 4 and 3, it will be seen that the block 50 connecting the terminals $32^3$ and $32^4$ the motor will move in the reverse and lower the valve again. When the valve is carried downward and pressed firmly upon its seat by the stem 13 operating on spring 15, it will be seen that the arm 52 (Figure 3) pulling on the spring 51 will draw the contact blade $48^c$ out of contact with the blades 44 and 45 of block 41 and break contact and the motion will then cease. It will be understood that in the starting of the valve ordinarily the head 76 is somewhat depressed from contact with the plug 12, and when the motor starts the first effect is to strike a sharp blow upon the plug 12 and release the valve from its seat 10.

Having thus described my invention and illustrated its use, what I claim as new, and desire to secure by Letters Patent, is the following:

1. A valve operating mechanism comprising in combination a gate valve having a chamber closed by a plug therein, a valve stem extending through said plug into the chamber and provided upon its inner end with a head, said chamber being so formed as to allow of some free play of the head therein and a spring engaging the valve stem whereby the valve is pressed downward by the spring and may be struck a blow by the stem in rising.

2. A valve operating mechanism comprising in combination a gate valve and stem therefor, means for moving the same longitudinally and a resilient connection between said valve and stem whereby the stem may continue to descend for a short time after the valve is seated and the valve may be struck a blow by the stem in rising.

3. A valve operating mechanism comprising in combination a gate valve and stem therefor together with a spring and lost motion connection between them, said parts being so constructed that the valve is seated by resilient force and unseated by a blow of the stem in rising.

4. A valve operating mechanism comprising in combination a threaded valve stem, a rotary member engaging said thread and being provided with a worm gear together with a valve switch mechanism operated by said worm gear to shut off the current of the operating mechanism when the valve is opened or closed.

5. A switch mechanism for electrically operated valves comprising two pairs of stationary terminals having contact blades, two movable blocks operated by the movement of the valve in opening or closing and means to actuate the valve and blocks, said blocks alternately engaging pairs of the terminal blocks to break the current when the valve is at either extreme end of its motion.

In testimony whereof I have hereunto set my hand in the presence of the two subscribing witnesses.

GEORGE W. HAYDEN.

Witnesses:
PAUL CARPENTER,
EDWARD C. BURNS